United States Patent
Lafontaine et al.

(10) Patent No.: US 6,218,742 B1
(45) Date of Patent: Apr. 17, 2001

(54) SELECTIVE IGNITION SWITCH

(75) Inventors: Yvan Lafontaine, Grand-Mère; Daniel Desmeules, Lac à la Tortue, both of (CA)

(73) Assignee: Megatech Electro, Inc., Grand-Mere (CA)

( * ) Notice: Subject to any disclaimer, the term of this patent is extended or adjusted under 35 U.S.C. 154(b) by 0 days.

(21) Appl. No.: 09/185,911

(22) Filed: Nov. 4, 1998

(51) Int. Cl.$^7$ ..................................................... B60R 22/00
(52) U.S. Cl. ........................................... 307/10.6; 307/10.2
(58) Field of Search ................................. 307/10.7, 10.6, 307/10.2; 324/379, 399; 361/154; 362/488; 340/425, 532; 70/237, 252, 233, 375, 248, 186; 180/287; 200/61.2

(56) References Cited

U.S. PATENT DOCUMENTS

| | | | |
|---|---|---|---|
| 4,090,175 | 5/1978 | Hart | 340/825.32 |
| 4,298,776 | 11/1981 | Sondermann | 200/11 C |
| 4,322,959 | 4/1982 | Mochida | 70/241 |
| 4,608,536 | * 8/1986 | Jacobs et al. | 324/399 |
| 4,805,427 | 2/1989 | Bates et al. | 70/264 |
| 4,910,980 | 3/1990 | Katoh | 70/277 |
| 4,965,460 | * 10/1990 | Tanaka et al. | 307/10.2 |
| 5,168,733 | 12/1992 | Rathmann et al. | 70/264 |
| 5,237,133 | 8/1993 | Frank | 200/11 C |
| 5,309,743 | 5/1994 | Kokubu et al. | 70/257 |
| 5,475,997 | * 12/1995 | Chung | 70/375 |
| 5,549,089 | 8/1996 | Snell et al. | 123/352 |
| 5,561,997 | 10/1996 | Milman | 70/283 |
| 5,634,358 | * 6/1997 | Myers | 70/233 |
| 5,638,712 | 6/1997 | Kuroda | 70/268 |
| 5,715,713 | 2/1998 | Aubry et al. | 70/277 |
| 5,756,947 | 5/1998 | Trimble, Jr. et al. | 200/11 C |

* cited by examiner

Primary Examiner—Josie Ballato
Assistant Examiner—Sharon Polk
(74) Attorney, Agent, or Firm—Wells, St. John, Roberts, Gregory & Matkin P.S.

(57) ABSTRACT

A selective ignition switch for a vehicle provided with two motors is disclosed herein. The selective ignition switch includes a selective switch assembly, a lock assembly to energize the selective switch assembly and a key to toggle the lock assembly. The selective switch assembly and the lock assembly are connected to a controller that activate the selective ignition switch mechanism relay the signals from the selective switch assembly to the two ignition systems of the vehicle.

14 Claims, 4 Drawing Sheets

SELECTIVE IGNITION SWITCH

FIELD OF THE INVENTION

The present invention relates to ignition switches. More specifically, the present invention is concerned with a selective ignition switch.

BACKGROUND OF THE INVENTION

The majority of motor vehicles are equipped with a conventional ignition system including an ignition switch coupled with a locking mechanism actuated by a key. Such an apparatus allows two important, but also related, functions to be associated. Indeed, the locking mechanism protects the vehicle against unauthorized uses while the ignition switch controls the ignition of the vehicle. Consequently a user must be in possession of an adequate key to operate the vehicle.

Although conventional ignition systems do not suffer of any major drawbacks when used in vehicles provided with a single motor, for example a car, problems may arise when they are used to start a vehicle provided with two separate motors, for example a boat since it may be detrimental to start both motors simultaneously.

The usual solution to this problem is to separate the two components of the ignition switch, i.e. the locking mechanism and the ignition switch, in two distinct controls. Hence, vehicles having two motors are usually provided with a locking mechanism to energize the ignition system and two separate ignition switches, usually in the form of push buttons, and each associated with one of the motors.

Furthermore, ignition systems mounted on water vehicles are usually provided with a safety mechanism to stop the motors should the user fall off the water vehicle. Such mechanism usually consists of an additional key that is both inserted in a lock and attached to the driver. Hence, if the driver falls in the water, the key gets out of the lock and the motors are stopped.

Consequently, water vehicles are usually provided with three different systems associated with the ignition of the motors.

DESCRIPTION OF THE PREFERRED EMBODIMENT

Figure 1:
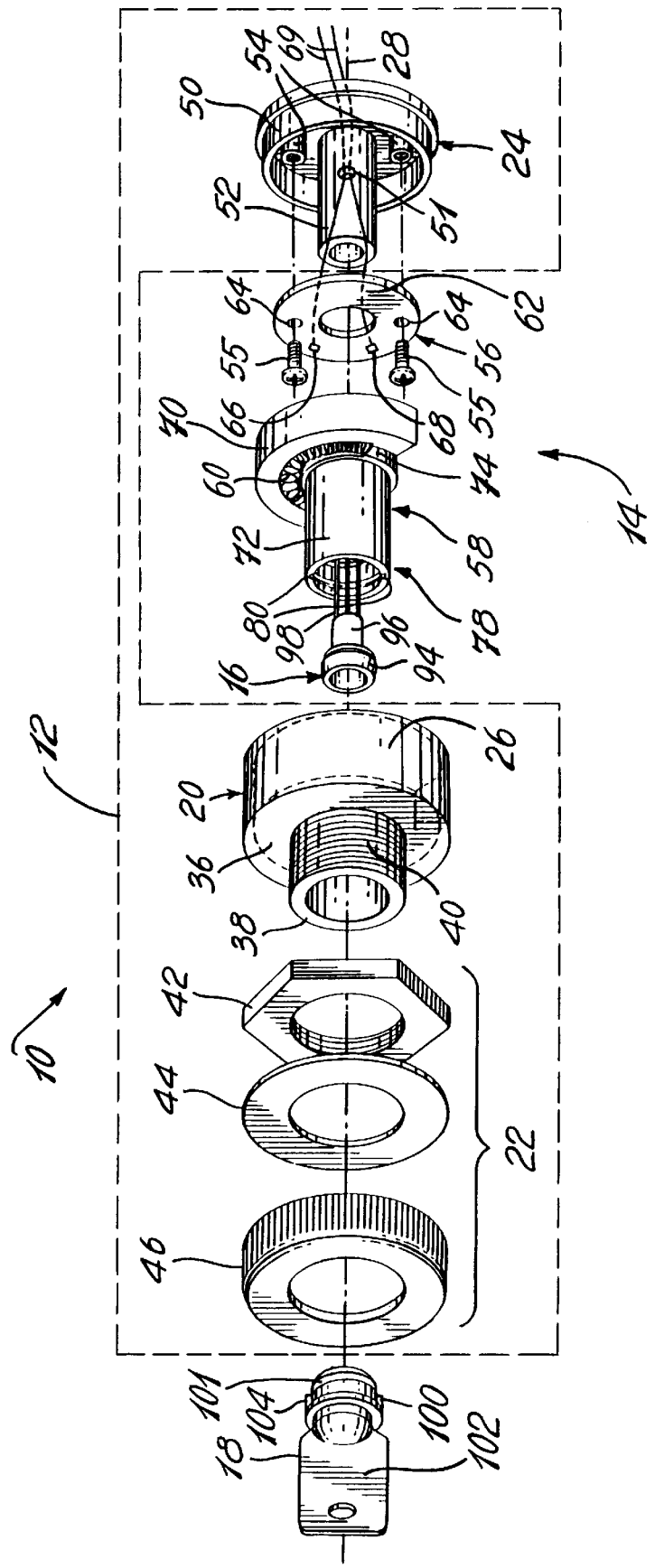
FIG. 1 is an exploded view of a selective ignition switch according to a preferred embodiment of the present invention.
Figure 2:
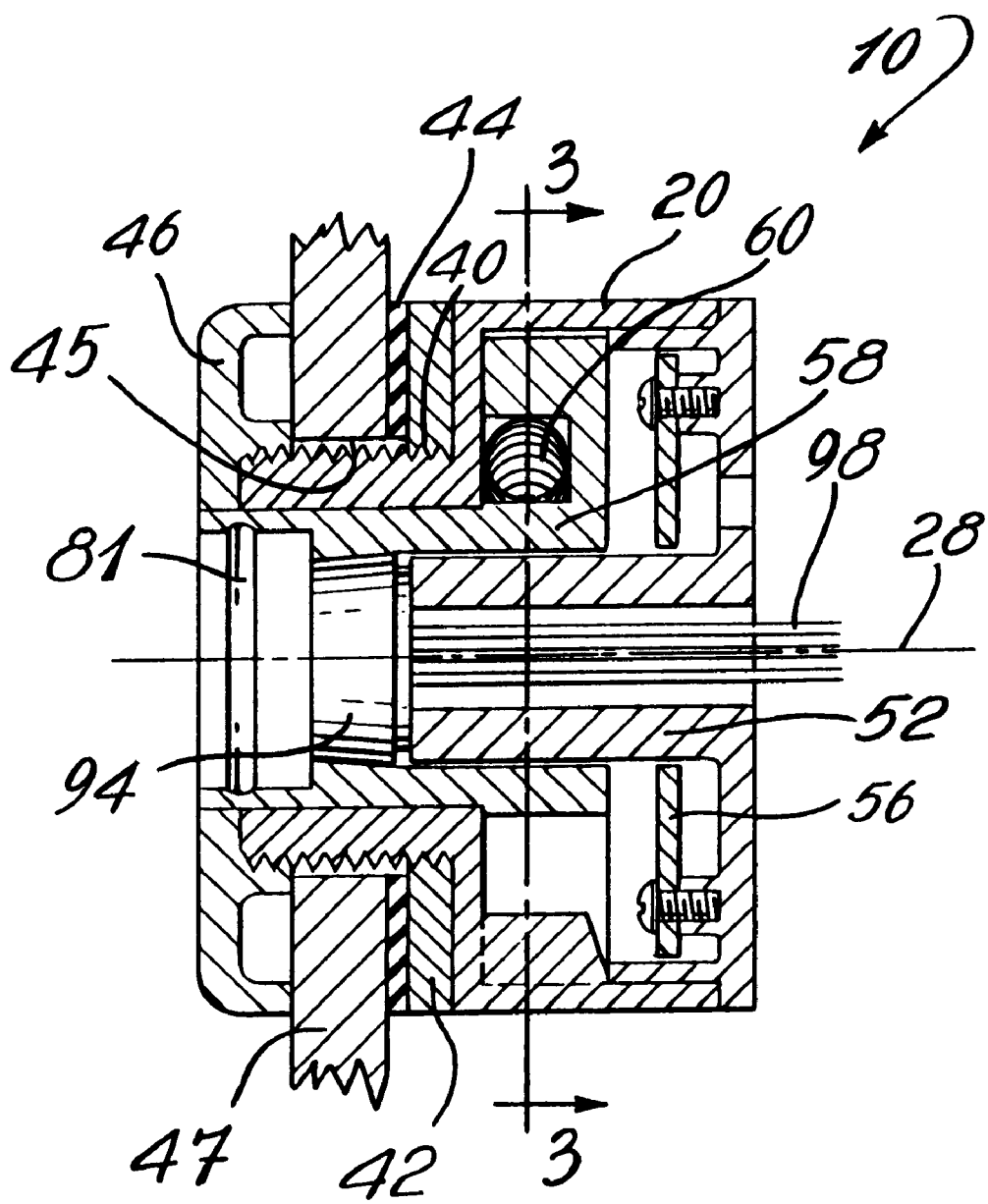
FIG. 2 is a sectional view of the selective ignition switch of FIG. 1.

Referring to FIGS. 1 to 3 of the appended drawings, a selective ignition switch 10, according to a preferred embodiment of the present invention, will be described.

The selective ignition switch 10 comprises a housing 12, a selective switch assembly 14, a lock system 16 and a key 18.

The housing 12 includes a body 20, an anchoring assembly 22 and a rear lid 24.

The body 20 includes a first cylindrical hollow portion 26, centered about a longitudinal axis 28 and covered by a top plate 36. The inner surface of the top plate 36 includes two integral projecting lateral stop 30 and 32 while the inner surface of the first cylindrical hollow portion 26 includes an integral central stop 34, the purpose of which will be explained hereinbelow.

The body 20 also includes a second cylindrical hollow portion 38 provided with a threaded external surface 40. The second cylindrical hollow portion 38 is continuous with the top plate 36 and coaxial with the first cylindrical hollow portion 26.

The anchoring assembly 22 includes a nut 42, a washer 44 and a cover 46. The nut 42 and the cover 46 are configured and sized to be screwed on the second cylindrical hollow portion 38 of the body 20. The washer 44 is preferably made of a resilient material, such as, for example, rubber, to prevent water from entering the vehicle by the aperture 45 through which the switch 10 is installed. When the selective ignition switch 10 is mounted to the control board 47 of a vehicle, the control board 47 is located between the cover 46 and the washer 44 (see FIG. 2).

As will be further described hereinbelow, the rear lid 24 is mainly used to close the open end of the body 20 and to support the moving parts of the switch 20. Thus, the rear lid 24 includes a peripheral flange 50, an integral open ended cylindrical hollow portion 52, coaxial with the longitudinal axis 28, and two screw receiving apertures 54.

The external diameter of the flange 50 is slightly smaller than the internal diameter of the first cylindrical hollow portion 26, allowing the flange 50 to snugly fit in the first cylindrical hollow portion 26. Of course, fasteners (not shown) could also be used to secure the lid 24 to the body 20.

The open ended cylindrical hollow portion 52 is provided with a lateral aperture 51 through which electrical wires may extend as will be described below.

The rear lid 24 and the first cylindrical hollow portion 26, together form a generally closed container to protect the selective switch assembly 14 and lock system 16 from the elements.

The two screw receiving apertures 54 are integral with the rear lid 48 and are provided with threaded internal surfaces to receive screws 55.

The selective switch assembly 14 will now be described in greater details. The assembly 14 includes a circuit board 56, a rotatable portion 58 and a biasing element in the form of a spring 60.

The circuit board 56 is generally ring shaped and includes two apertures 64 through which the circuit board 56 may be fixedly mounted to the rear lid 24 via the screws 55.

The circuit board 56 includes two magnetic switches in the form of Hall effect sensors 66 and 68 so mounted thereto as to face the rotatable portion 58. Each sensor 66 and 68 includes connectors 69, to connect sensors 66 and 68 to a controller 110 as will be explained below.

The rotatable portion 58 includes a generally C-shaped element 70, centered about the longitudinal axis 28, a hub 72, coaxially mounted to the element 70, and a recess 74 provided between the C-shaped element 70 and the hub 72 and configured to receive the spring 60. The external diameter of the C-shaped element 70 is slightly smaller than the internal diameter of the first cylindrical hollow portion 26 of the body 20, allowing rotation of the C-shaped element 70 about the longitudinal axis 28.

The C-shaped element 70 is provided with a magnet 76 so positioned in the C-shaped element 70 as to face the circuit board 56. The purpose of the magnet 76 and of the Hall effet sensors 66 and 68 will be explained hereinbelow.

The distal end 78 of the hub 72 has two diametrically opposed longitudinal grooves 80 and a circumferential channel 81, better seen in FIG. 2. The hub 72 is so configured and sized that the key 18 may be positioned in its distal end 78.

Figure 3C:
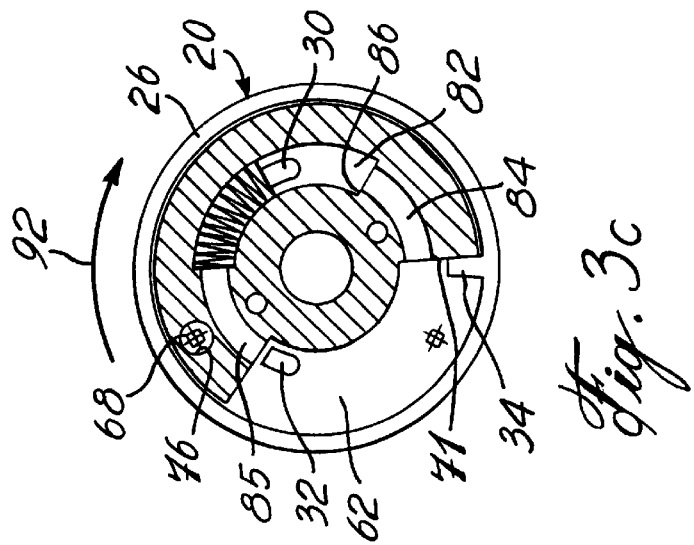
FIG. 3c is a sectional view similar to FIG. 3a showing the locking mechanism when the key is turned to the right.
Figure 3B:
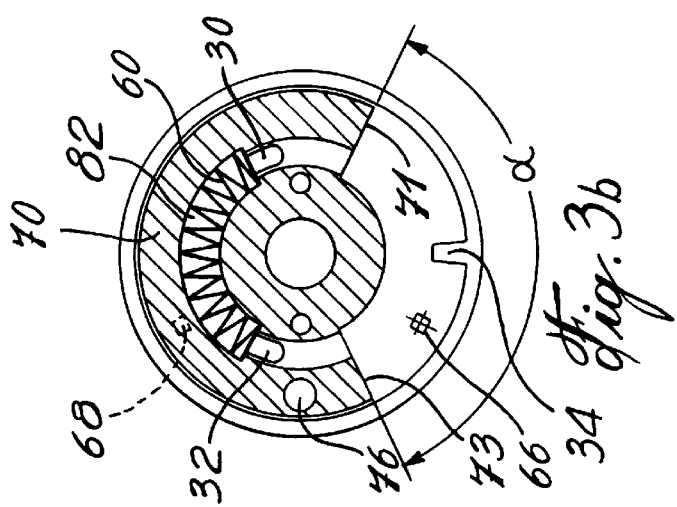
FIG. 3b is a sectional view similar to FIG. 3a showing the locking mechanism when the key is in its neutral position.
Figure 3A:
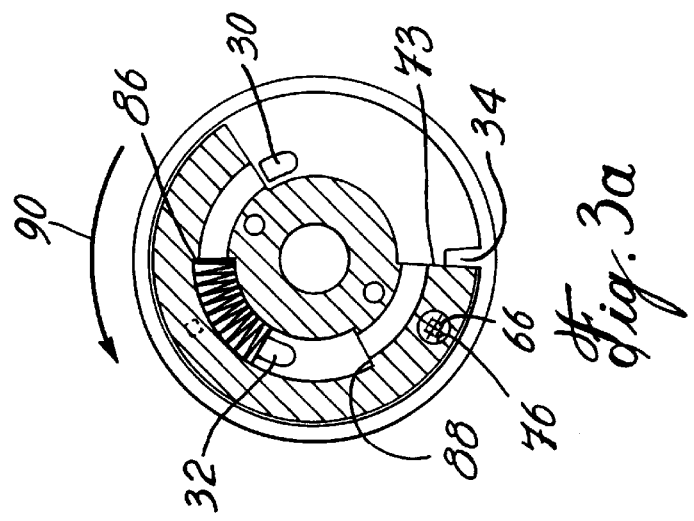
FIG. 3a is a sectional view taken along line 3—3 of FIG. 2, illustrating the locking mechanism when the key is turned to the left.

As can be better seen from FIGS. 3a to 3c, the semicircular recess 74 has two different sections: a central section, defining a spring housing 82, and two peripheral sections 84, 85. The spring housing 82 is wider than the peripheral sections 84, 85, defining two spring receiving shoulders 86 and 88. Peripheral sections 84 and 85 are wide enough to respectively receive the two lateral stops 30 and 32 of the body 20 when the rotatable portion 58. is positioned in the body 20.

As can be seen in FIG. 3b, the C-shaped element 70 includes two radial edges 71, 73, spanned over an angle a. The position of the magnet 76 and of the Hall effect sensors 66, 68 are such that the magnet 76 is aligned with the sensor 66 when a rotation to the left (arrow 90) of the rotatable portion 58 in the body 20 brings the edge 73 in contact with the stop 34 (see FIG. 3a). Similarly the magnet 76 is aligned with the sensor 68 when the rotation to the right (arrow 92) of the rotatable portion 58 in the body 20 brings the edge 71 in contact with the stop 34 (see FIG. 3c).

Figure 4:
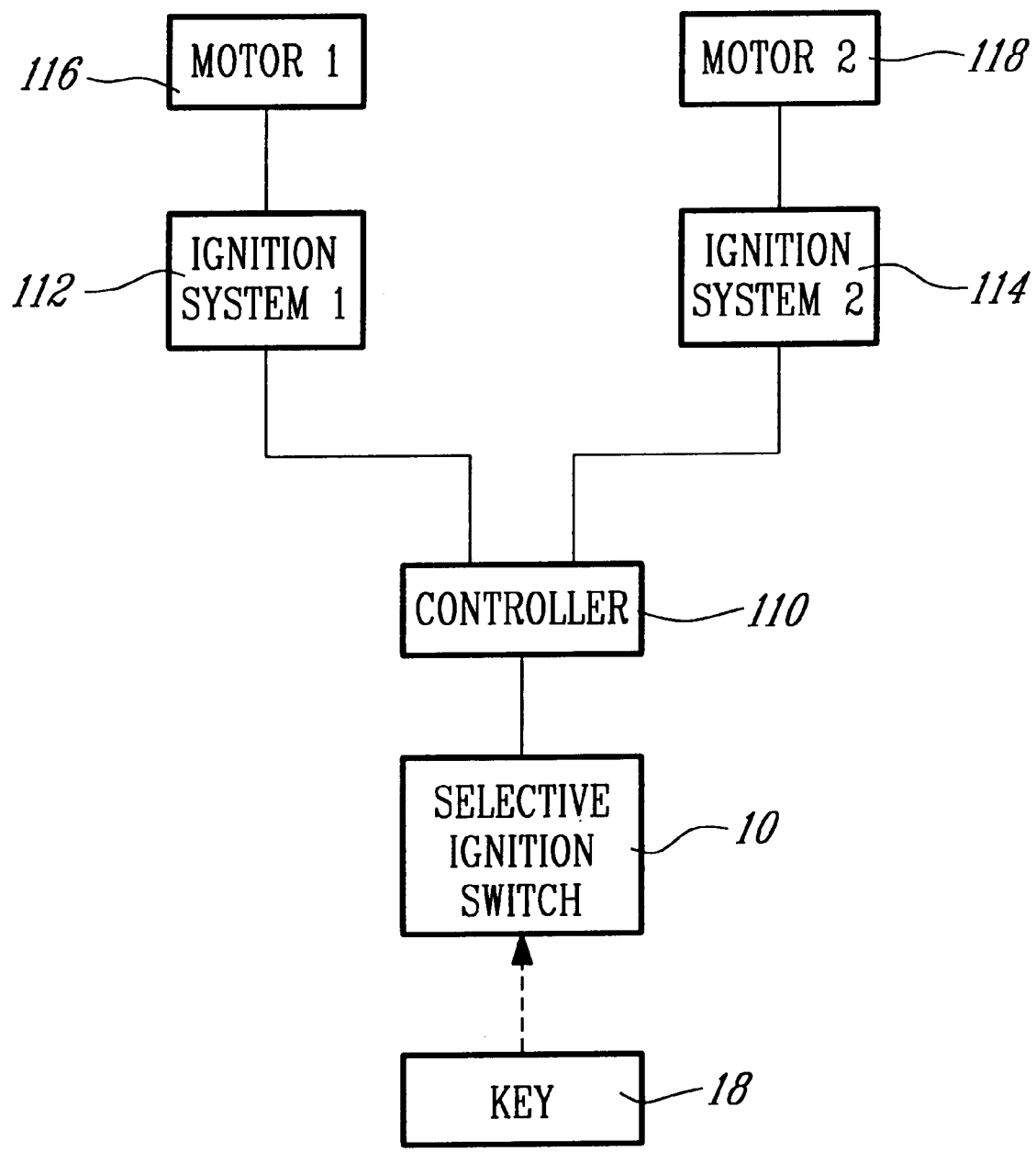
FIG. 4 is a bloc diagram showing the interactions between the selective ignition switch of FIG. 1 and a propulsion system of a vehicle.

Returning to FIG. 1, the lock system 16 includes a reader head 94, a reed switch 96, and electrical connectors 98 to connect the reader head 94 and the reed switch 96 to a controller 110 (FIG. 4). Reed switches are believed well known in the art and will not be described herein. The reader head 94 is secured in the hub 72 and longitudinally positioned as to contact the key 18 when the key 18 is inserted in the selective ignition switch 10.

It is to be noted that the first cylindrical hollow portion 26 and the circular aperture in the rear lid 24, together form a conduit for the connectors 69 and 98 between the selective ignition switch 10 and the controller 110.

The key 18 includes an actuating head portion 100 provided with an integral handle 102 and a peripheral projecting flange 101 made of resilient material. The actuating head portion 100 is configured and sized to be inserted in the open end of the hub 72 where the projecting flange 101 enters the peripheral channel 81.

The actuating head 100 includes a contact pad connected to an electronic module (both not shown), a magnet (also not shown) and two diametrally opposite teeth 104 on its outer surface. The contact pad of the key 18 is so positioned as to contact the reader head 94 when the key 18 is inserted in the hub 72. Similarly, the magnet of the key 18 causes the reed switch 96 to toggle from a locked position to an unlocked position when the key is inserted in the hub 72.

It is to be noted that the contact between the reader head 94 and the contact pad enables the reader head to "read" the electronic module of the key 18 to thereby enable the controller 110 to determine if the key 18 enables its user to use the vehicle.

This type of technology is believed well known in the art of electronic locks and will not be further discussed herein.

As will be easily understood by one skilled in the art, conventional transponders systems could also be known. Of course, if this is the case, no contact is required between the reader head and the key 18.

The operation of the selective ignition switch 10 will now be described in greater details.

The installation of the a selective ignition switch according to the present invention to a vehicle is as follows. The selective ignition switch 10 is first mounted to a control board 47 of a vehicle (not shown) via the anchoring assembly 22 and is connected to a controller 110 via the electric wires 69 and 98. The controller 110 is further connected to two ignition systems 112 and 114 of motors 116 and 118, respectively.

It is to be noted that the connections between the components of the switch 10 can be anything from wires to radio signal emitting-receiving apparatuses.

The controller 110 is advantageously embodied by a conventional control processing unit (CPU) obtaining data from the electronic module of the key 18 and determining if the ignition systems 112 and 114 are to be energized.

To operate the selective ignition switch 10, the key 18 is inserted in the hub 72. As can be seen in FIG. 1, the key 18 must be correctly oriented for the two teeth 104 (only one shown) of the key 18 to cooperate with the two grooves 80 of the hub 72. Before the insertion of the key 18, the selective ignition switch 10 is in its locked state and both the controller 110 and the reader head 94 are not energized.

When the key 18 is inserted in the hub 72, the magnet of the actuating head 100 activates the reed switch 96 and both the controller 110 and the reader head 94 are energized. The reader head 94 then reads the data of the electronic module of the key 18 and sends this data to the controller 110. If the controller 110 does not recognize the electronic signature of the key 18, the controller 110 does not allow the user to start the vehicle. The electronic signature of the key is in the form of binary informations hard coded in the electronic module.

If the controller 110 recognizes the electronic signature of the key 18, the controller 110 is ready to receive ignition signals from the selective ignition switch 10 which is then in its unlocked state. The key 18 is held in place via the contact between the flange 101 and the channel 81.

The FIG. 3b illustrates the selective ignition switch 10 in a neutral position, when the rotatable portion 58 is not turned by a rotation of the key 18. The spring 60 then rest on the spring receiving shoulders 86 and 88 in a generally uncompressed state. As can be seen in FIG. 3b, the magnet 76 of the rotatable portion 58 is then positioned at mid course between the two sensors 66 and 68.

When the key 18 is rotated counterclockwise, the projections 104, engaged in the longitudinal grooves 80 of the hub 72 cause the rotatable portion 58 to rotate counterclockwise. The rotation of the rotatable portion 58 is illustrated by the arrow 90 in FIG. 3a. This rotation compresses the spring 60 on the spring receiving shoulders 86 by the projection 32, aligning the magnet 76 with the sensor 66. The rotation of the key 18 is stopped by the central stop 34. The hall effect sensor 66 is triggered by the magnet 76 and a first ignition signal is transmitted to the controller 110. The controller 110 then transmits a control signal to the first ignition system 112 that starts the first motor 116. When the key 18 is released by the user, the tension in the spring 60 makes the rotatable portion 58 to rotate clockwise and the selective ignition switch 10 returns to its neutral position of FIG. 3b.

Similarly, when the key 18 is rotated clockwise, the projections 104, engaged in the longitudinal grooves 80 of the hub 72 cause the rotatable portion 58 to rotate clockwise. The rotation of the rotatable portion 58 is illustrated by the arrow 92 in FIG. 3*c*. This rotation compresses the spring 60 on the spring receiving shoulders 88 by the projection 30, aligning the magnet 76 with the sensor 68. The rotation of the key 18 is stopped by the central stop 34. The hall effect sensor 68 is triggered by the magnet 76 and a second ignition signal is transmitted to the controller 110. The controller 110 then transmits a control signal to the second ignition system 114 that starts the second motor 118. When the key 18 is released by the user, the tension in the spring 60 makes the rotatable portion 58 to rotate counterclockwise and the selective ignition switch 10 returns to its neutral position of FIG. 3*b*.

It is to be noted that the controller is so designed that further rotation of the key 18 causes the motors to stop. More specifically, a further counterclockwise rotation of the key 18 stops the first motor 116 while a further clockwise rotation of the key 18 stops the second motor 118. The selective ignition switch 10 may therefore be viewed as a start-stop switch.

When the key 18 is removed from the selective ignition switch 10, the reed switch 96 is deactivated, both the controller 110 and the reader head are de-energized and the selective ignition switch returns to its locked state. One can see that this is a safety feature of the selective ignition switch 10 since the driver of the water vehicle can, for example, tie the key 18 to himself. If the driver falls to the sea, the key 18 is automatically removed from the selective ignition switch 18 and the two motors 116 and 118 stop.

Although the present invention has been described for a vehicle having two motors, the selective ignition switch according to the present invention could be used to start any devices provided with two propulsion systems or having two components that are advantageously energized separately.

It is also to be noted that the rotation movement of the key to energize the ignition systems could be other than rotational. For example, it is believed within the skills of one skilled in the art to design a selective ignition switch according to the present invention where the key would be tilted up and down to respectively energize the ignition systems.

The present invention has been described with some electronic components, but one skilled in the art could easily design a selective ignition switch where all the components would be mechanical. For example, the key could be a conventional key and the lock system could be a conventional lock mechanism. Furthermore, the sensors 66 and 68 could be replaced by miniature switches.

The reed switch could also be replaced by other conventional switching elements, such as, for example, two conductor plates, one in the key, the other in the selective ignition switch.

The spring can easily be replaced by a magnet or any other mechanisms that produces a force to bring the rotatable portion to its neutral position whenever the driver stops applying a rotational force to the key.

The automatic interruption of the motors whenever the driver removes the key from the selective ignition switch could be removed from the selective ignition switch described hereinabove without departing from the spirit and nature of the present invention.

Although the present invention has been described hereinabove by way of preferred embodiments thereof, it can be modified, without departing from the spirit and nature of the subject invention as defined in the appended claims.

What is claimed is:

1. A selective ignition switch mechanism to be mounted to a vehicle provided with first and second ignition systems, said selective ignition switch comprising;
    a lock assembly configured and sized to be mounted to the vehicle;
    a key configured to cooperate with said lock assembly to toggle the lock assembly between a locked state and an unlocked state; and
    a selective switch assembly including:
    a first magnetic switch mounted in said lock assembly; said first magnetic switch including a first connector configured to be connected to the first ignition system;
    a second magnetic switch mounted in said lock assembly; said second magnetic switch including a second connector configured to be connected to the second ignition system; and
    a rotatable portion so configured as to be rotated by said key; said rotatable portion including a magnet;
    whereby, when said lock assembly is in said unlocked state: a) rotation of said rotatable portion in a first direction so positions said magnet as to trigger said first magnetic switch, and b) rotation of said rotatable portion in a second direction so positions said magnet as to trigger said second magnetic switch.

2. A selective ignition switch mechanism as recited in claim 1, further comprising a controller; said controller being connected to a) the first and second ignition systems, b) the lock assembly, and c) the first and second magnetic switches; said controller being configured to activate the selective ignition switch mechanism and to relay signals to the first and second ignition systems from said first and second magnetic switches.

3. A selective ignition switch mechanism as recited in claim 2, wherein said key has an electronic signature and wherein said lock assembly includes a reader head connected to said controller; said controller being programmed to recognize said electronic signature of said key; said key toggling said lock assembly from said locked state to said unlocked state when said controller recognizes said electronic signature of said key.

4. A selective ignition switch mechanism as recited in claim 3, wherein said reader head includes a reed switch and wherein said key includes a reed switch actuating magnet; said controller detecting said key via said reed switch and said reed switch actuating magnet.

5. A selective ignition switch mechanism as recited in claim 1, wherein said lock assembly includes grooves and wherein said key includes teeth to cooperate with said grooves.

6. A selective ignition switch mechanism as recited in claim 1, wherein said magnetic switches are Hall effect sensors.

7. A selective ignition switch mechanism as recited in claim 1, wherein selective switch mechanism includes a biasing element to bias said rotatable portion towards a neutral position.

8. A selective ignition system for a vehicle comprising;
    first and second ignition systems each mounted to said vehicle;
    a selective ignition switch mechanism including:
    a lock assembly, configured and sized to be mounted to the vehicle;
    a key configured to cooperate with said lock assembly to toggle the lock assembly between a locked state and an unlocked state; and a selective switch mechanism including:

a first magnetic switch mounted in said lock assembly and connected to said first ignition system;

a second magnetic switch mounted in said lock assembly and connected to the second ignition system; and a rotatable portion configured to be rotated by said key; said rotatable portion including a magnet;

whereby, when said lock assembly is in said unlocked state: a) rotation of said rotatable portion in a first direction so positions said magnet to trigger said first magnetic switch, and b) rotation of said rotatable portion in a second direction so positions said magnet to trigger said second magnetic switch.

9. A selective ignition system as recited in claim 8, further comprising a controller; said controller being connected to a) the first and second ignition systems, b) the lock assembly, and c) the first and second magnetic switches; said controller being configured to activate the selective ignition system and to relay signals to the first and second ignition systems from said first and second magnetic switches.

10. A selective ignition system as recited in claim 9, wherein said key has an electronic signature and wherein said lock assembly includes a reader head connected to said controller; said controller being programmed to recognize said electronic signature of said key; said key toggling said lock assembly from said locked state to said unlocked state when said controller recognizes said electronic signature of said key.

11. A selective ignition system as recited in claim 10, wherein said reader head includes a reed switch and wherein said key includes a reed switch actuating magnet; said controller detecting said key via said reed switch and said reed switch actuating magnet.

12. A selective ignition system as recited in claim 8, wherein said lock assembly includes grooves and wherein said key includes teeth to cooperate with said grooves.

13. A selective ignition system as recited in claim 8, wherein said magnetic switches are Hall effect sensors.

14. A selective ignition system as recited in claim 8, wherein selective switch system includes a biasing element to bias said rotatable portion towards a neutral position.

* * * * *